United States Patent [19]

Pyle et al.

[11] 4,306,325
[45] Dec. 22, 1981

[54] VEHICLE WASH EQUIPMENT

[75] Inventors: Clayton C. Pyle, Bloomington, Minn.; Ronald V. Plummer, Oren, Utah; Bobby R. Wigelsworth, Minnetonka, Minn.

[73] Assignee: Valley Service and Installation, Inc., Burnsville, Minn.

[21] Appl. No.: 135,918

[22] Filed: Mar. 31, 1980

[51] Int. Cl.³ .............................................. B60S 3/06
[52] U.S. Cl. ................................ 15/53 A; 15/DIG. 2
[58] Field of Search ............ 15/53 A, 53 AB, DIG. 2

[56] References Cited

U.S. PATENT DOCUMENTS

| | | | |
|---|---|---|---|
| D. 247,437 | 3/1978 | Nelson | D15/37 |
| 3,434,173 | 3/1969 | Kenyon et al. | 15/53 A |
| 3,456,275 | 7/1969 | Solomon | 15/53 AB |
| 3,593,357 | 7/1971 | Oldham | 15/53 AB |
| 3,688,328 | 9/1972 | Wilkins | 15/53 AB |
| 3,750,212 | 8/1973 | Bernardi et al. | 15/53 AB |
| 3,755,844 | 9/1973 | Ennis et al. | 15/53 AB |
| 3,783,466 | 1/1974 | Bernardi | 15/53 A |
| 3,798,696 | 3/1974 | Cirino | 15/53 A |
| 3,823,356 | 7/1974 | Paavola et al. | 15/53 A |
| 3,909,865 | 10/1975 | Scheuermann | 15/53 AB |
| 4,035,862 | 7/1977 | Ennis et al. | 15/53 AB |
| 4,039,014 | 9/1977 | Sellars | 15/53 AB |
| 4,063,327 | 12/1977 | Barber | 15/53 AB |
| 4,110,865 | 9/1978 | Bivens | 15/53 AB |

FOREIGN PATENT DOCUMENTS

| | | | |
|---|---|---|---|
| 1280622 | 7/1972 | United Kingdom | 15/DIG. 2 |
| 2003438 | 3/1979 | United Kingdom | 15/DIG. 2 |

Primary Examiner—Edward L. Roberts
Attorney, Agent, or Firm—Kinney, Lange, Braddock, Westman and Fairbairn

[57] ABSTRACT

A "roll over" type vehicle wash apparatus includes a frame which is movable on a track and which is driven between a front end and a rear end of the track. The apparatus includes a pair of front arms and a pair of rear arms which are pivotally connected to the frame. Side wrap brushes are rotatably connected to each of the front and rear arms and are rotated about vertical axes. Positioned proximate the rear end of the track are arm deflectors which cause the rear arms to be driven inward toward one another as the frame approaches the rear end. This prevents the rear arms of the apparatus from being accidentally driven through doors at the ends of the bay area in the event of a failure of the actuators of the rear arms.

16 Claims, 10 Drawing Figures

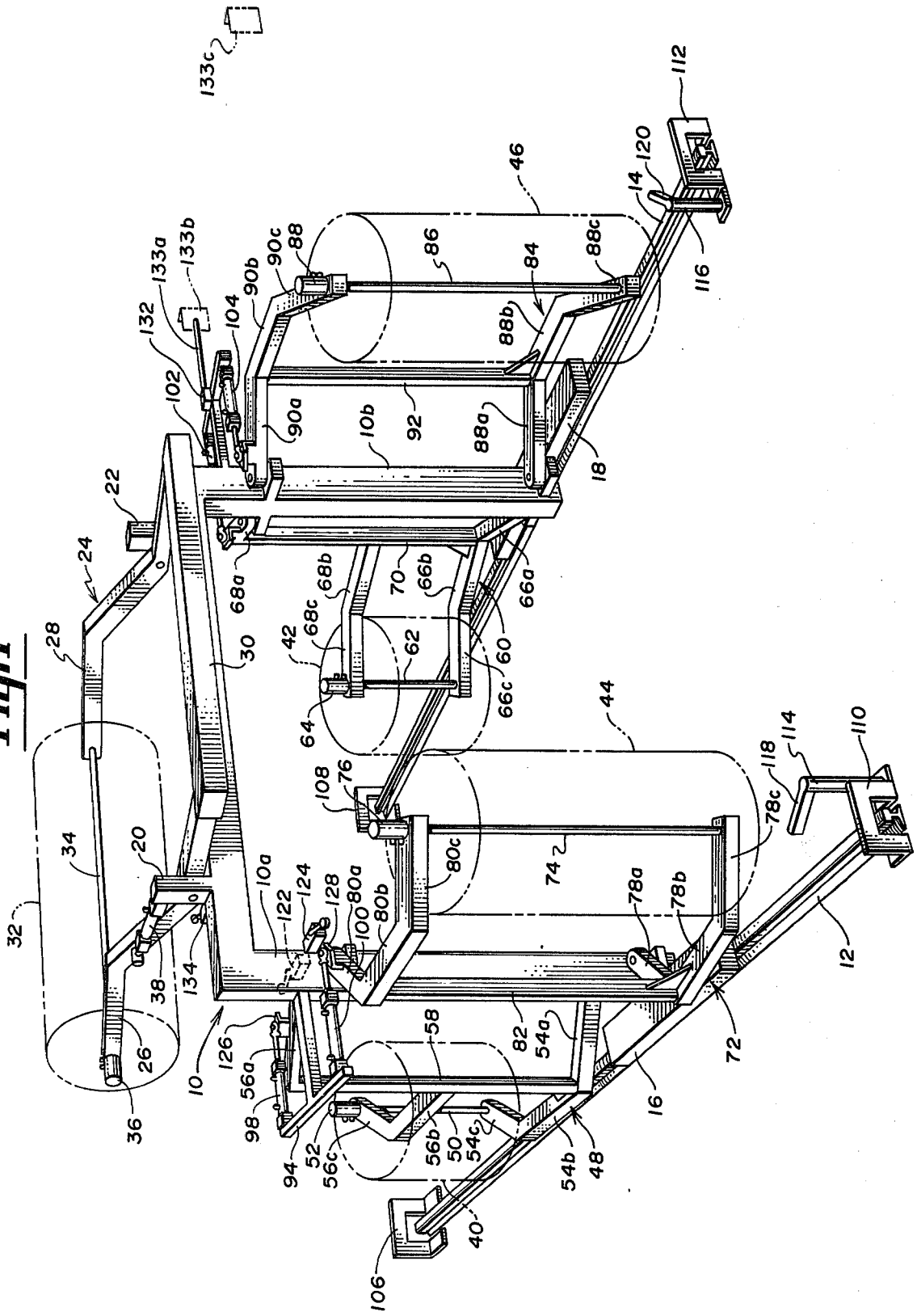

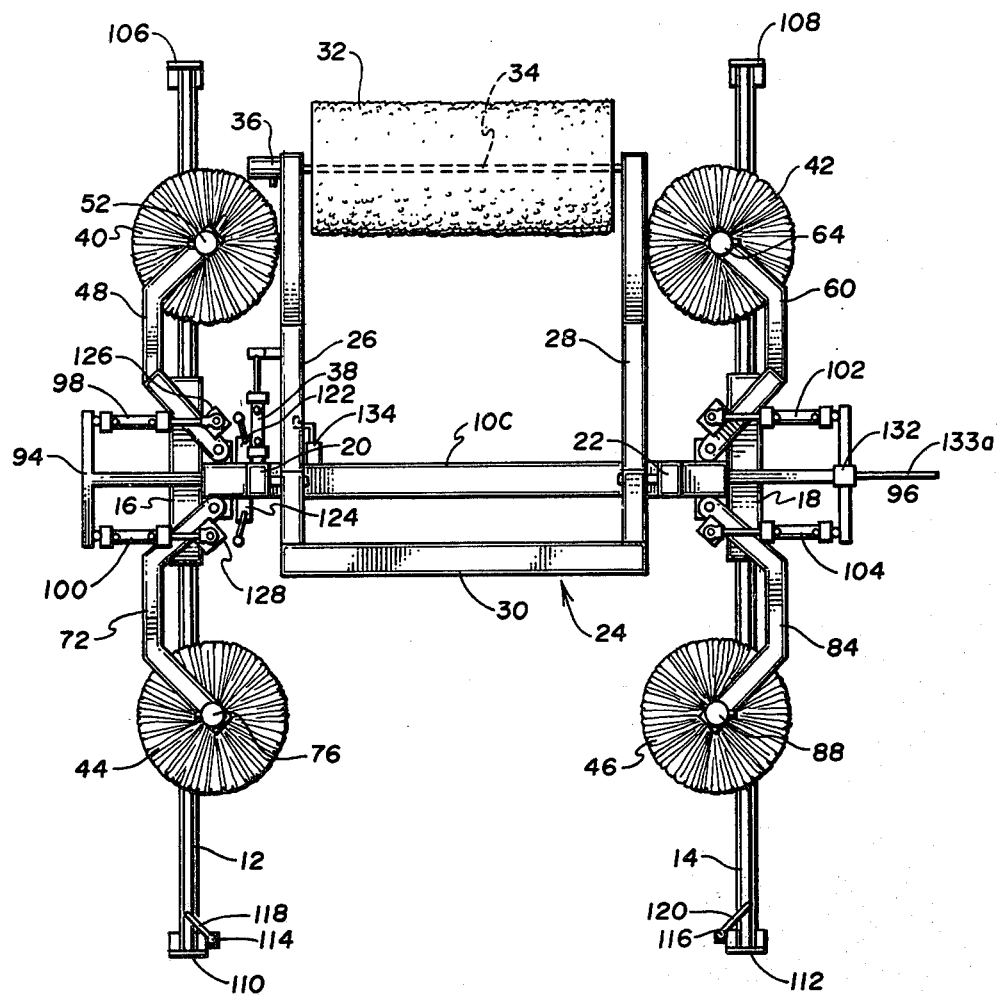
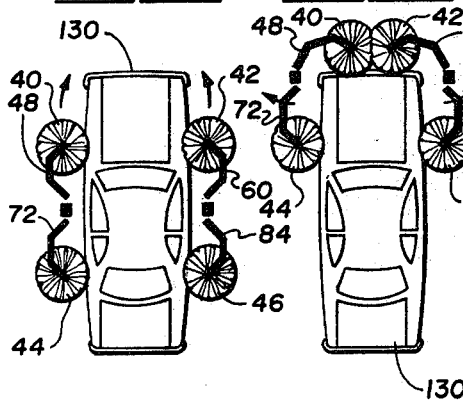
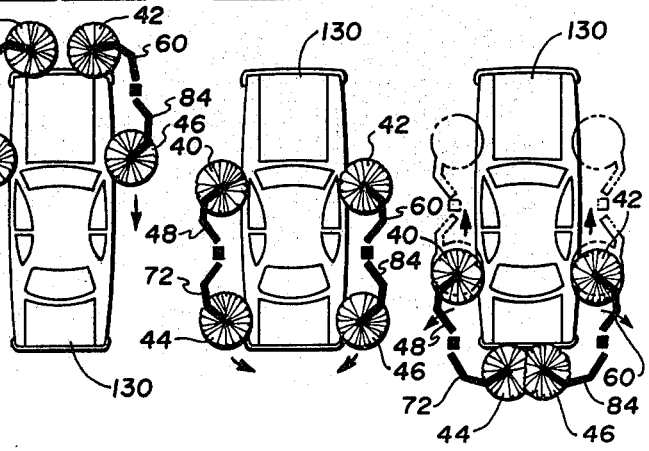

VEHICLE WASH EQUIPMENT

REFERENCE TO CO-PENDING APPLICATION

Reference is made to a co-pending application entitled "Control System for Automatic Vehicle Wash," Ser. No. 135,522, filed on even date with this application and assigned to the same assignee as the present application.

BACKGROUND OF THE INVENTION

1. Field of the Invention

The present invention relates to automatic vehicle washing equipment.

2. Description of the Prior Art

Many types of automated vehicle washing equipment have been developed for washing cars and trucks. The two most widely used types of equipment at this time are the "drive through" type and the "roll over" type.

In the "drive through" type of apparatus, the washing mechanism is in a fixed position and the automobile or other vehicle is driven or propelled through the washing mechanism at a predetermined speed. In this type of apparatus, the vehicle enters at one end of the car wash and exits at the other end after washing has been completed.

The "roll over" type of vehicle washing apparatus includes a movable frame which carries the washing brushes, water and soap supplies, and the like. In this type of apparatus, the vehicle is parked and the movable frame moves over the vehicle to wash it.

SUMMARY OF THE INVENTION

The present invention is a roll over-type vehicle washing apparatus in which a movable frame is driven along a track between a front end and a rear end of the track. Pivotally connected to the frame are first and second front arms and first and second rear arms. The first and second front side wrap brushes are rotatably connected to the first and second front arms respectively. Similarly, the first and second rear side wrap brushes are rotatably connected to the first and second rear arms, respectively.

Positioned proximate the rear end of the track are means for engaging the rear arms and driving the rear arms inward toward one another as the frame approaches the rear end. The apparatus of the present invention, therefore, prevents damage to doors or other structures located near the rear end of the track in the event of a malfunction in which the rear arms fail to be driven inward by actuators controlling the rear arm positions. This is particularly beneficial when the apparatus is located within a very small bay area where there is very little clearance between the ends of the track and the doors at the ends of the bay area.

BRIEF DESCRIPTION OF THE DRAWINGS

FIG. 1 is a perspective view of the car wash apparatus of the present invention viewed generally from the rear of the apparatus and with the top and side wrap brushes shown in phantom.

FIG. 2 is a top plan view of the car wash apparatus of the present invention.

FIGS. 3A-3E are sequential illustrations of the apparatus of FIGS. 1 and 2 illustrating operation from start to finish of a washing cycle.

DETAILED DESCRIPTION OF THE PREFERRED EMBODIMENTS

Figure 4A:
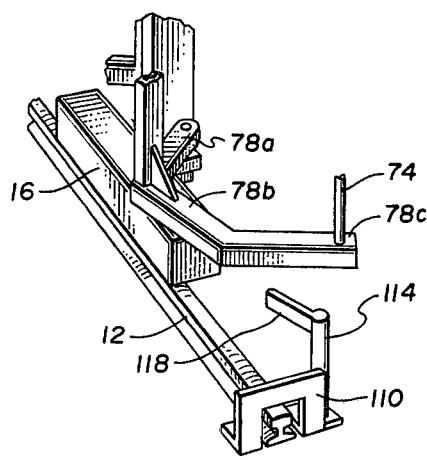
FIGS. 4A-4C are fragmentary perspective views illustrating the operation of the posts which force the arms inward as the apparatus reaches the end of its track.

FIGS. 1 and 2 show the car wash equipment of the present invention, which is of the "roll-over type." As shown in FIGS. 1 and 2, the equipment includes frame 10, which is movable back and forth on parallel rails 12 and 14. Frame 10 includes left and right vertical members 10a and 10b and horizontal top member 10c, which extends between the top ends of vertical frame members 10a and 10b. Attached to the bottom ends of vertical frame members 10a and 10b are bases 16 and 18, which roll on rails 12 and 14, respectively. The entire apparatus is driven back and forth automatically on rails 12 and 14 by a motor drive (not shown) of a conventional type used in roll-over car wash equipment.

Connected to the top member 10c of frame 10 are two upstanding members 20 and 22. Top brush support 24 is pivotally connected to members 20 and 22, and includes arms 26 and 28 and counterweight cross bar 30. Top brush 32 is supported and rotates about the axis of shaft 34. Hydraulic motor 36 drives shaft 34 to rotate top brush 32.

The position of top brush 32 is controlled by hydraulic actuator 38 which has one end pivotally connected to upstanding member 20, and its opposite end pivotally connected to arm 26. Actuator 38 is a double acting hydraulic actuator which raises and lowers brush 32 by pivoting arms 26 and 28 upward or downward, respectively. Counterweight cross bar 30 has a weight which normally biases roller 30 to its uppermost position, and actuator 38 drives roller 30 downward during operation of the vehicle wash equipment.

In addition to top brush 32, the vehicle wash apparatus shown in FIGS. 1 and 2 has four side wrap brushes: left and right front side wrap brushes 40 and 42, and left and right rear side wrap brushes 44 and 46. Rear brushes 44 and 46 are taller than front brushes 40 and 42 because they are used to wash the back ends of vans and trucks.

Each of the four side wrap brushes is supported by an arm assembly which is pivotally connected to frame 10. The left front arm assembly 48 is pivotally connected to left vertical frame member 10a and is rotatable about a vertical pivot axis. Brush 40 is mounted at the free end of arm assembly 48 and is rotatable about vertical shaft 50. Hydraulic motor 52 drives shaft 50 and brush 40.

As shown in FIG. 1, arm assembly 48 includes a lower arm formed by members 54a, 54b and 54c, and an upper arm formed by members 56a, 56b and 56c and a vertical support member 58. Members 54a and 56a are pivotally connected to left vertical frame member 10a, and shaft 50 and motor 52 are mounted on members 54c and 56c at the opposite ends of arm assembly 48. The upper and lower arms form, when viewed from a top view (FIG. 2), a generally C-shaped configuration.

Right front arm assembly 60 is a mirror image of left front arm assembly 48. Arm assembly 60 is pivotally connected to right vertical frame member 10b, and has a vertical shaft 62 and a hydraulic driver motor 64 mounted at the free ends of arm assembly 70 to rotate brush 42. Arm assembly 60 includes a lower arm formed by members 66a, 66b and 66c, an upper arm formed by members 68a, 68b and 68c, and a vertical support member 70.

Left arm rear assembly 72 is pivotally connected to left vertical frame member 10a, and brush 44 is rotatably mounted on shaft 74 which is supported at the free end of arm assembly 72. Hydraulic motor 76 drives shaft 74 and brush 44. Arm assembly 72 includes a lower arm formed by members 78a, 78b and 78c, an upper arm formed by member 80a, 80b and 80c, and a vertical member 82 which extends between the upper and lower arms.

Right rear arm assembly 84 is a mirror image of left rear arm assembly 72, and is pivotally connected to right vertical frame member 10b. Brush 46 is rotated on vertical shaft 86, which is supported at the free end of arm assembly 84 and is driven by hydraulic motor 88. Arm assembly 84 includes a lower arm formed by members 88a, 88b and 88c, an upper arm formed by members 90a, 90b and 90c, and a vertical member 92 which extends between the upper and lower arms. As with front arm assemblies 48 and 60, rear assemblies 72 and 84 have generally C-shaped configurations when viewed from the top, as in FIG. 2.

Connected to left vertical frame member 10b is a T-shaped member 94. Similarly, T-shaped member 96 is connected to right vertical frame member 10b. Hydraulic actuators 98 and 100 are connected between T member 94 and left arm assemblies 48 and 72, respectively. Actuators 98 and 100 are double-acting hydraulic cylinders which control the position of arm assemblies 48 and 72. Similarly, hydraulic actuators 102 and 104 are connected between the ends of T member 96 and right arm assemblies 60 and 84. Actuators 102 and 104 are double-acting hydraulic cylinders which control the positions of right arm assemblies 68 and 84.

When a vehicle wash apparatus is installed in a very short bay area, a malfunction of the apparatus so that the arms are not folded in as the apparatus approaches one end of the rails can result in the arms and brushes being driven through the doors at the ends of the bay. This has been a significant problem with prior art rollover type car wash equipment. Generally, the doors to the bays are expensive to replace and must be specially ordered. This can result in the car wash apparatus being placed out of operation for a significant period of time. The apparatus of the present invention overcomes this problem.

Position at the front ends of rails 12 and 14 are upstanding stop members 106 and 108, respectively. Stop members 106 and 108 limit the forward movement of frame 10 and the attached brushes and arm assembly by engaging the front ends of movable bases 16 and 18. As best shown in FIG. 2, top brush support 24 and top brush 32 extend forward of front arms 48 and 60. Stop members 106 and 108 are positioned to engage the front ends of movable bases 16 and 18 before brush 32 can touch the front door (not shown) of the bay. In this way front arms 48 and 60 can never reach the front door, even if the front arms are not folded in.

Upstanding stop members 110 and 112 are positioned at the rear ends of rails 12 and 14, respectively, and limit the rearward movement of the apparatus on rails 12 and 14. Positioned adjacent stop members 110 and 112 are upstanding posts 114 and 116 to which are attached deflector members 118 and 120, respectively. Posts 114 and 116 and deflector members 118 and 120 engage the lower arms of rear arm assemblies 72 and 84 and force the arms inward as the apparatus approaches rear stops 110 and 112. The cooperation of posts 114 and 116, and deflectors 118 and 120 with arm assemblies 72 and 84 prevents damage to doors or other structures which are located near the rear end of the rails 12 and 14. In the present invention, in the event of a failure of actuators 102 or 104, or a system malfunction, the arms will be automatically forced in by posts 114 and 116 and deflectors 118 and 120.

Also shown in FIGS. 1 and 2 are arm position sensing microswitches 122 and 124, which sense the position of front arm assembly 48 and rear arm assembly 72. Microswitches 122 and 124 have an actuator end which engages mounting brackets 126 and 128, respectively, on arm assemblies 48 and 72. Mounting brackets 126 and 128 pivotally connect one end of actuators 98 and 100 to the arm assemblies. As the arms are pivoted inward, bracket 126 or 128 finally triggers limit switch 122 or 124, thereby indicating that the arm has been folded in to near its innermost position. As described in further detail in the previously mentioned co-pending patent application, the signals from microswitches 122 and 124 are used to prevent both the front and rear arms from being driven inward at the same time. This can be a dangerous condition when very short subcompact cars are being washed. When a signal from microswitch 122 is received, rear arms 72 and 84 are driven outward to a retracted position. Similarly, when a signal is received from microswitch 124 the front arms 40 and 60 are driven outward to a retracted position.

In addition to switches 122 and 124, the apparatus of the present invention also includes two other switches which provide signals for controlling operation. HOME TRAVEL switch 132 is mounted on T member 96, and has a feeler arm which engages location indicating tabs 133b and 133c (shown in phantom in FIG. 1). Tab 133b indicates the "home" position of frame 10, while tab 133c indicates that frame 10 has reached its rear limit of travel. TOP BRUSH DOWN switch 134 senses the position of top brush support 24, and thus the position of top brush 32.

FIGS. 3A-3E illustrate the normal automatic operation of the side wrap brushes in the vehicle wash apparatus of the present invention. As shown in FIG. 3A, a vehicle 130 is driven into position and is stopped with the center of the car wash apparatus located slightly forward of the center of vehicle 130. As operation of the apparatus commences, actuators 98, 100, 102 and 104 (shown in FIGS. 1 and 2) swing arms 48, 60, 72 and 84 inward until brushes 40, 42, 44 and 46 are in contact with the sides of the vehicle 130. Frame 10 is driven along rails 12 and 14 toward the front end of vehicle 130 and the front end of rails 12 and 14. As the apparatus reaches the front end of vehicle 130, as shown in FIG. 3B, arms 48 and 60 begin to pivot inward to maintain brushes 40 and 42 in contact with the front surfaces of vehicle 130. When arms 48 and 60 have pivoted in sufficiently that switch 122 is actuated, arms 72 and 80 are automatically driven outward to a recessed position, as illustrated by the curved arrows in FIG. 3B.

As shown in FIG. 3B, the direction of movement of frame 10 then reverses and frame 10 begins to move toward the rear end of vehicle 130 and rails 12 and 14. As front arms 48 and 60 begin to separate, switch 122 returns to its original state, and rear arms 72 and 84 are permitted to swing back toward vehicle 130 thereby bringing rear brushes 44 and 46 into contact with the sides of vehicle 130.

FIG. 3D shows the vehicle wash apparatus as it is approaching the rear end of vehicle 130. As shown in FIG. 3D, all four sides wrap brushes are in contact with the sides of vehicle 130. In FIG. 3E, arms 72 and 84 are driven inward to maintain brushes 44 and 46 in contact with the rear end of vehicle 130. When switch 124 changes state as a result of arm 72 being driven inward, front arms 48 and 60 are automatically retracted as illustrated by the curved arrows in FIG. 3E.

The direction of movement of frame 10 is again reversed so that the frame 10 begins moving toward the front of vehicle 130. This forward movement of frame 10 continues until frame 10 has returned to the original starting position, as illustrated in phantom in FIG. 3E.

Figure 4B:
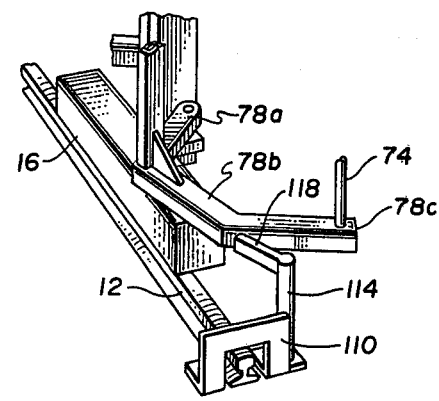
Figure 4C:
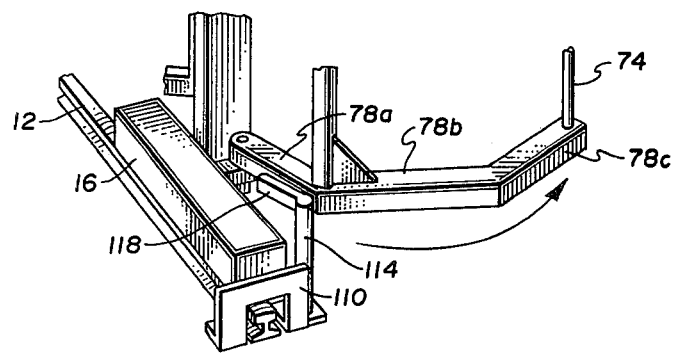

The operation illustrated in FIGS. 3A–3E represents the normal automatic operation of the apparatus of the present invention. As long as there is no failure of the actuators or other system malfunction, the front and rear arms will automatically follow the contours of vehicle 130, and should not endanger doors or other objects near the end of the bay area in which the apparatus is installed. As described previously, front stops 106 and 108, rear stops 110 and 112, posts 114 and 116, and deflectors 118 and 120 provide a safety feature in the apparatus of the present invention which prevents the arms from breaking or damaging the doors even in the event of a system malfunction. FIGS. 4A, 4B and 4C show the operation of post 114 and deflector 118 in conjunction with arm assembly 72 in automatically forcing arm 72 inward as frame 10 approaches the rear end of its travel. It will be understood, of course, that post 114, deflector 120, and arm assembly 84 operate in a similar manner.

As shown in FIG. 4A, base 16 is approaching rear stop 110, and arm 72 (and in particular lower arm member 78c) has not yet engaged post 114. At this point, arm 78 can still be pivoted inward without endangering a door or other structure at the end of the bay.

In FIG. 4B, base 16 has continued to move toward rear stop 110, and lower arm member 78c has begun to engage deflector 118 and post 114. As base 16 continues to move toward rear stop 110, the outer surface of member 78c, then member 78b, and finally member 78a rides against and is driven inward by deflector 118 and post 114. Deflector 118 is provided to guide arm member 78c into contact with post 114 and prevent the outer end of arm member 78c from catching or hanging up on post 114.

In FIG. 4C, the rear end of base 16 has engaged stop member 110. Post 114 and deflector 118 have caused arm assembly 72 to be entirely folded in and are engaging the outer surface of member 78a. It can be seen, therefore, that the present invention causes the arms to be driven inward as the assembly reaches either end of its travel.

Although the present invention has used upstanding posts 114 and 116 and deflectors 118 and 120 which engage the arm assemblies, other configurations of the arm engaging means may be used in accordance with the present invention. The posts and deflectors, however, are inexpensive, easy to position, and extremely effective, and therefore are used in the preferred embodiments shown in the Figures.

Although the present invention has been described with reference to preferred embodiments, workers skilled in the art will recognize that changes may be made in form and detail without departing from the spirit and scope of the invention.

What is claimed is:

1. A roll-over type vehicle wash apparatus comprising:

track means having a front end and a rear end;
frame means movable on the track means between the front end and the rear end;
first and second front arm means pivotally connected to opposite sides of the frame means;
first and second front side wrap brush means rotatably connected proximate free ends of the first and second front arm means, respectively;
first and second rear arm means pivotally connected to opposite sides of the frame means;
first and second rear side wrap brush means rotatably connected proximate free ends of the first and second rear arm means, to rotate about first and second vertical pivot axes, respectively;
front actuator means connected between the frame means and the first and second front arm means for controlling the position of the front arm means to move the first and second front side wrap brush means into engagement with the vehicle; and
rear actuator means connected between the frame means and the first and second rear arm means for controlling the position of the rear arm means to move the first and second rear side wrap brush means into engagement with the vehicle;
means positioned proximate the rear end for engaging the first and second rear arm means and driving the free ends of the first and second rear arm means inward toward one another as the frame means approaches the rear end if the rear actuator means has not moved the first and second rear arm means inward toward one another.

2. The apparatus of claim 1 wherein the means positioned proximate the rear end comprise first and second upstanding members for engaging the first and second rear arm means, respectively.

3. The apparatus of claim 2 wherein the track means comprises first and second substantially parallel rails on which the frame means is movable, and wherein the first and second upstanding members are fixedly positioned proximate the rear ends of the first and second rails, respectively.

4. The apparatus of claim 3 wherein the first and second rear arms each comprise an upper arm means member and a lower arm member.

5. The apparatus of claim 4 wherein the first and second upstanding members engage the lower arm members of the first and second rear arm means, respectively, as the frame means approaches the rear end of the first and second rails.

6. The apparatus of claim 5 wherein the means positioned proximate the rear end further comprise first and second deflector means for engaging the lower members of the first and second rear arm means and guiding the lower members into contact with the first and second upstanding members, respectively, as the frame means approaches the rear end of the first and second rails.

7. The apparatus of claim 6 wherein the first and second deflector means are connected to and project from the first and second upstanding members, respectively.

8. The apparatus of claim 1 and further comprising:
rear stop means positioned proximate the rear end of the track means for engaging and stopping the frame means at the rear end.

9. The apparatus of claim 8 wherein the means positioned proximate the rear end for engaging the first and second rear arm means is positioned proximate the rear stop means.

10. The apparatus of claim 1 and further comprising:
front stop means positioned proximate the front end of the track means for engaging and stopping the frame means at the front end.

11. A roll-over vehicle wash apparatus comprising:
first and second substantially parallel horizontal rails defining a track having a first end and a second end;
frame means movable on the track between the first end and the second end;
first and second arms pivotally connected to opposite sides of the frame means to pivot about first and second generally vertical arm axes, respectively;
first and second brushes rotatably connected proximate free ends of the first and second arm means to rotate about first and second generally vertical brush axes, respectively;
actuator means connected to the frame means and the first and second arms for controlling the position of the first and second arms; and
first and second upstanding members positioned proximate the first end of the first and second rails, respectively, for engaging the first and second arms to drive the arms so that the free ends of the first and second arms move inward toward one another as the frame means approaches the first end if the actuator means has failed to move the free ends of the arm means inward toward one another.

12. The apparatus of claim 11 and further comprising:
stop means positioned proximate the front end for engaging and stopping the frame means at the first end.

13. The apparatus of claim 11 wherein the first and second arms each comprise an upper arm member and a lower arm member.

14. The apparatus of claim 13 wherein the first and second upstanding members engage the lower arm members of the first and second arms, respectively, as the frame means approaches the first end.

15. The apparatus of claim 14 wherein the means positioned proximate the first end further comprise first and second deflector means for engaging the lower members of the first and second arms and guiding the lower members into contact with the first and second upstanding members, respectively, as the frame means approaches the first end.

16. The apparatus of claim 15 wherein the first and second deflector means are connected to and project from the first and second upstanding members, respectively.

* * * * *